March 8, 1949. B. CARTER ET AL 2,464,024
BOBBIN HOLDER
Filed March 14, 1946
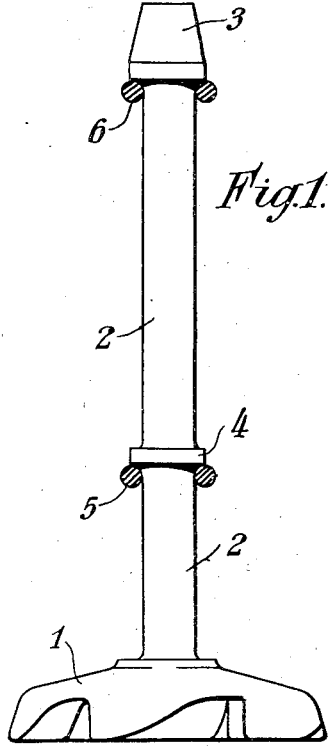
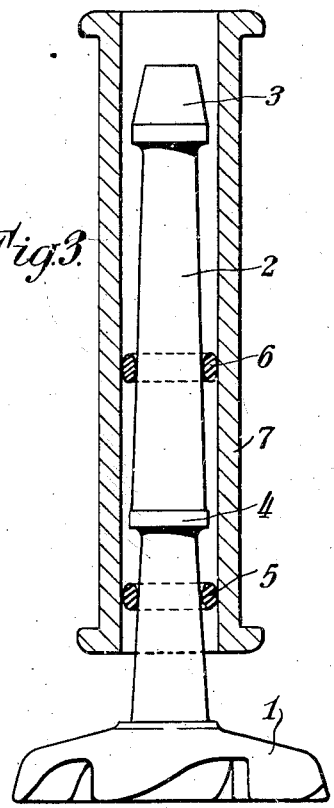
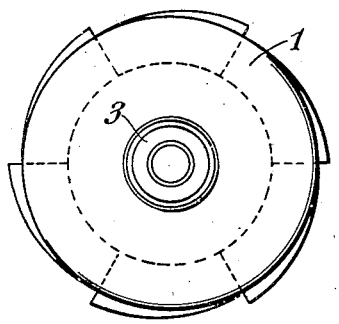
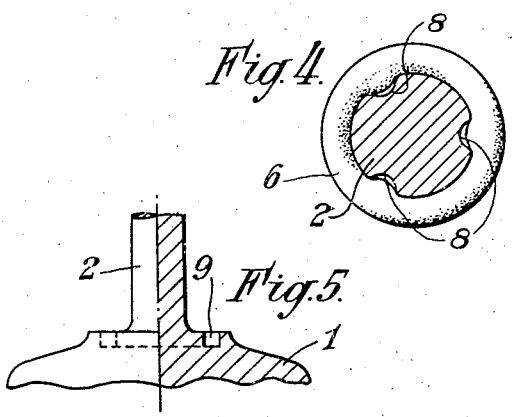

Patented Mar. 8, 1949

2,464,024

UNITED STATES PATENT OFFICE 2,464,024

BOBBIN HOLDER

Ben Carter and Eric Carter, Bolton, England

Application March 14, 1946, Serial No. 654,408
In Great Britain February 28, 1945

Section 1, Public Law 690, August 8, 1946
Patent expires February 28, 1965

4 Claims. (Cl. 242—46.2)

This invention relates to holders for bobbins and other wound packages in textile machinery and wire working machinery, such as braiding, plaiting, creeling and winding and spinning machinery.

It is necessary that the package (hereinafter referred to generally as a cop) be carried by the holder firmly so as to be driven thereby, and also that the cop be removable and replaceable endwise of the holder without undue difficulty. Holders as hitherto used have comprised a base with ratchet teeth on its underside to engage the usual driving pawl, and an upright spindle or post in the centre of such plate. The common practice hitherto has been to form the upright spindle of the holder with longitudinal bow springs, but it has been found that in placing the cops in position on the holder, and in removing them, there is a tendency for the operator to twist them around the spindle to facilitate their endwise movement, and this distorts the springs and eventually causes the distorted springs to damage the inside of the cop tube. The present invention provides alternative means for securing the cops on the holders, which give an improved drive, a more easy replacement and removal of the cop, and a very simple alteration of holder for cop tubes of different diameter.

According to this invention the spindle of the holder is provided with one or more rubber or like compressible rings, of a size requiring them to be compressed by the cop tube, and adapted to roll along the spindle as the tube is placed thereon and removed, suitable stops being provided to limit the rolling movement of the ring or rings.

According to another feature of the invention the spindle is made to a slightly tapered form so that, as the rings roll along the spindle during the placing of the cop thereon, they tend to become expanded by the spindle and are pressed more firmly against the cop tubes, thereby increasing the driving grip of the rings on the spindle and on the tube.

According to a further feature of the invention, the spindle is formed with longitudinal grooves or recesses into which the compressed rings relieve themselves locally, thereby forming a species of key to still further improve the driving effect of the spindle on the cop. Cop tubes may themselves be formed with longitudinal grooves or the like, for the same purpose.

In the preferred forms of the invention there are two rubber rings, each arranged between collars or flanges limiting their movement along the spindle. The holders will usually be of metal, but could be of wood, or of moulded plastics or other suitable solid material.

The accompanying drawing illustrates the preferred embodiment of the invention:

Fig. 1 is an elevation of the holder with the two rings in section and in the position ready for the reception of a cop tube;

Fig. 2 is a plan of the same;

Fig. 3 is a like view to Fig. 1, showing a cop tube partly in position, the tube being in section and the rings in elevation, and the spindle being of tapering form as described above;

Fig. 4 is a sectional plan, to a larger scale, of a spindle having the longitudinal grooves for the purpose stated; and Fig. 5 is a sectional elevation of a part of a spindle including a modification described below.

As shown in Figs. 1 and 2 the holder comprises the usual circular ratchet-toothed plate or base 1 and a central post or spindle 2 upstanding therefrom, the spindle being surmounted by a tapered, bull-nosed or similar head 3 (which is of larger diameter than the spindle) to facilitate its entrance into the cop tube. Around the spindle, at a distance from the ratchet plate is an intermediate collar or flange 4 of a similar diameter to the largest part of the said head. The spindle is of uniform diameter between the head and the intermediate collar, and between that collar and the base, except for the rounded corners or fillets.

Placed on the spindle between such intermediate collar 4 and the ratchet plate 1, is a round-sectioned rubber ring 5, which is a tight fit on the spindle; and a similar ring 6 is placed around the spindle between such intermediate collar 4 and the head 3. These rings 5 and 6 are of such diameter than when on the spindle, they extend outwards beyond the collar and head respectively and are slightly larger than the inner diameter of the cop tube.

In use, with the rings lying against the head and the collar respectively, as shown, the tapered head 3 is inserted into one end of the cop tube, until obstructed by the uppermost rubber ring 6 meeting the lower end of the cop tube, whereupon the tube is forced over that ring, which causes the ring to be compressed and to roll between the tube and spindle. When the tube meets the second ring 5, the same operation takes place, until the tube reaches the base 1.

This operation is shown partly completed in Fig. 3, the cop tube 7 having engaged both the rubber rings but not having reached the end of its movement on to the spindle. In this figure also, that part of the spindle between head 3 and collar 4 gradually increases in diameter from the top to the bottom, as also does that part between the collar 4 and the base 1. This increase of diameter causes a slight expansion of the rings and exerts an increased pressure on the cop tube. Usually, however, the rings will have sufficient grip without this tapering formation on the spindle.

As above stated, the spindle 2 may be grooved longitudinally to increase the driving grip of the rings thereon, and such grooves may be slightly spiral if desired. Figure 4 shows three grooves 8 into which the rings bulge slightly.

As the compression of the rubber, in the placing of the tube in position, causes a slight return movement up the spindle when the cop is released, the ratchet plate may be formed with a recess in its top face (if the end of the cop tube is of suitable shape) to allow a slight excess movement of the tube, so that, when the tube has made that slight return movement, it will be in the normal working position. Such a recess is shown at 9 in Fig. 5. If the end of the cop tube is of too broad a form to enter a recess, the base may be machined away to lengthen the spindle, for a similar purpose.

As the tube is removed, the rings become rolled back to their original positions, being obstructed respectively by the collar 4 and head 3.

With a holder according to this invention there is no disadvantage nor possible damage in twisting the cop tubes on to and off the spindles; there is no risk of damaging the tubes; and yet there is a firm driving grip. More than two rings may be provided if desired, preferably arranged with sufficient room to roll during the whole of the cop's movement whilst in engagement with them.

What we claim is:

1. A bobbin holder comprising a base, a post upstanding therefrom, an enlarged head on the top of such post, a flange on the post at a point just below its mid-length, a rubber ring of round section gripping the post between the head and the flange, and a second rubber ring of round section gripping the post between the flange and the base, the head and flange being of a diameter to pass freely into the bobbin, and the rings being of a diameter requiring their compression as they are inserted into the bobbin.

2. A bobbin holder for receiving and affording support to a bobbin having a longitudinal bore therein, such holder comprising a spindle formed at its upper end with an enlarged head, the spindle being provided at its lower end with a base plate, a collar of greater diameter than the spindle being carried intermediate the ends of the spindle, and resilient rings of generally circular cross-section carried on the spindle one being above and the other below such collar, the enlarged head and the collar being of such diameter as to freely enter the bore in the bobbin, the rings being of such diameter as to be compressed as they enter the bore and roll longitudinally of the bobbin.

3. A bobbin holder for receiving and affording support to a bobbin having a longitudinal bore therein, such holder comprising a spindle provided with an enlarged head at its upper end and carrying a base plate at its lower end, a collar formed intermediate the ends of the spindle, each section of the spindle below the head and the collar being of increasing diameter as the sections progress downwardly, and a resilient ring carried by each section and normally positioned adjacent the upper end of such section, the rings being of such diameter as to be compressed between the spindle and the bore as they are rolled downwardly when the bobbin is applied to the spindle.

4. A bobbin holder for receiving and affording support to a bobbin having a longitudinal bore therein, such holder comprising a spindle formed at its upper end with an enlarged head, the spindle being provided at its lower end with a base plate, a collar of greater diameter than the spindle being carried intermediate the ends of the spindle, and resilient rings of generally circular cross-section carried on the spindle one being above and the other below such collar, the enlarged head and the collar being of such diameter as to freely enter the bore in the bobbin, the rings being of such diameter as to be compressed as they enter the bore and roll longitudinally of the bobbin, the spindle having spaced, longitudinally-extending grooves therein into which the compressible rings may protrude to increase their driving grip on the spindle.

BEN CARTER.
ERIC CARTER.

REFERENCES CITED

The following references are of record in the file of this patent:

UNITED STATES PATENTS

| Number | Name | Date |
|---|---|---|
| 1,884,805 | Mority | Oct. 25, 1932 |
| 1,974,002 | Anderson | Sept. 18, 1934 |
| 2,042,968 | Siegenthaler | June 2, 1936 |
| 2,217,212 | Brandwood | Oct. 8, 1940 |